March 6, 1962 — C. C. BOOKOUT ETAL — 3,023,579
FLUID PRESSURE SYSTEM
Original Filed April 28, 1960 — 2 Sheets-Sheet 1

INVENTORS.
CHARLES C. BOOKOUT
PAUL E. TAYLOR
SVEN W. SATTAVARA
BY
ATTORNEYS

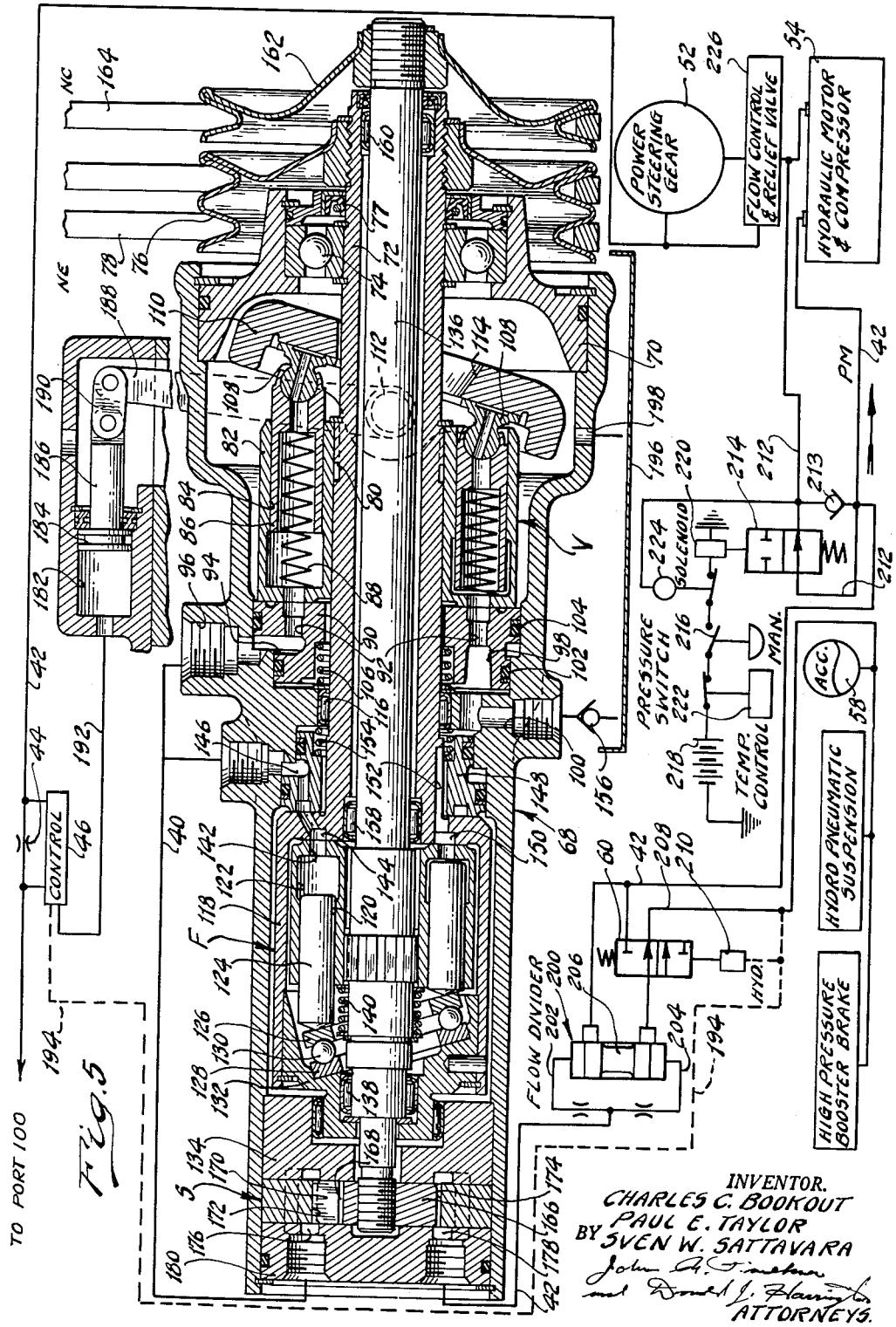

United States Patent Office 3,023,579
Patented Mar. 6, 1962

3,023,579
FLUID PRESSURE SYSTEM
Charles C. Bookout, Livonia, Sven W. Sattavara, Detroit, and Paul E. Taylor, Livonia, Mich., assignors to Ford Motor Company, Dearborn, Mich., a corporation of Delaware
Original application Apr. 28, 1960, Ser. No. 25,275, now Patent No. 2,988,889, dated June 20, 1961. Divided and this application Dec. 5, 1960, Ser. No. 73,728
9 Claims. (Cl. 60—51)

Our invention relates generally to a hydrostatic fluid circuit having a centralized pressure accumulator and pressure operated components.

More particularly our invention relates to a centralized accumulator system for energizing hydrostatic pressure operated accessories of an automotive vehicle, the pressure source being an engine powered pump.

Our system is particularly adapted to be used in combination with a hydrostatic accessory drive mechanism capable of transferring vehicle engine torque to engine driven accessories. We contemplate that this driving mechanism may comprise a first variable displacement, hydrostatic unit situated in a closed hydraulic circuit with a second hydrostatic unit. A third hydrostatic unit is disposed in the closed circuit that is common to the second and third hydrostatic units, and it functions as a fluid pump capable of powering a fluid motor that may be connected to a vehicle air conditioner compressor and to a pressure accumulator for a hydro-pneumatic suspension and power brakes. The hydrostatic units of the accessory drive can therefore be used as a source of pressure for charging the accumulator so that an adequate pressure is maintained in the accumulator under all driving conditions.

A principal feature of our invention resides in the provision of a flow divider valve system which is adapted to regulate the rate at which the accumulator is charged during operation. The valve functions to give priority to the pressure requirements of the hydrostatic accessory drive portion of the mechanism. When a desired accumulator pressure has been attained, provision is made for interrupting the rate of flow of pressurized fluid to the accumulator from the closed circuit for the hydrostatic accessory drive portion of the mechanism.

The provision of a system of the type above set forth being a principal object of our invention, it is a further object of our invention to provide a fluid circuit for automotive accessories wherein provision is made for giving priority to the pressure requirements of certain accessories, such as the power steering gear, under extreme driving conditions. A priority valave system is provided for this purpose.

This application forms a division of our copending application Serial No. 25,275, filed on April 28, 1960, now Patent No. 2,988,889.

We contemplate that our flow divider valve system and the priority valve system herein disclosed can be incorporated also in a hydraulic circuit having an engine accessory drive mechanism of a type that is different than the drive mechanism herein disclosed. Our copending parent application is principally directed to the drive mechanism herein disclosed.

Although other types of hydrostatic drives can be employed, we have included herein a description of the hydrostatic drive disclosed in the claims of the parent application in order to provide a suitable structural environment for the subject matter of our instant invention.

For the purpose of more particularly describing our invention, reference will be made to the accompanying drawings wherein.

Figure 1:
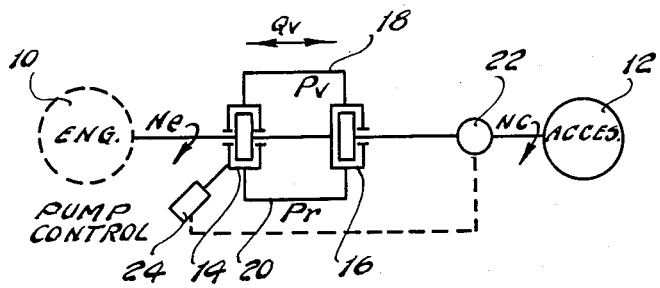
FIGURE 1 is a schematic circuit drawing of a hydrostatic accessory drive having a third hydraulic unit for providing an accessory speed signal.

Referring first to the schematic circuit drawing of FIGURE 1, we have illustrated a hydrostatic accessory drive for transmitting driving torque from a vehicle engine 10 to engine driven accessories 12. The hydrostatic drive which forms the power delivery path between engine 10 and accessories 12 comprises a variable displacement pump 14 and a differentially driven, fixed displacement pump 16 which are situated within a closed hydraulic circuit. The rotor for pump 14 is drivably coupled to the engine and is driven with a speed represented by the symbol $N_e$. The rotor for pump 14 is also mechanically coupled to the rotatable pump housing for the differential hydraulic unit 16 so that the rotor for pump 14 and the housing for pump 16 rotate at engine speed $N_e$. The pumps 14 and 16 are hydraulically connected to each other by means of a closed hydraulic circuit comprised in part by passages 18 and 20.

A third hydraulic unit is shown at 22 and it is drivably coupled to the accessory drive shaft. Unit 22 functions as a fluid pressure governor pump which is responsive to the driven speed of the accessories. The pressure signal made available by pump 22 is distributed to a pump displacement controlling mechanism or controller shown at 24. The controller 24 responds to the pressure signal made available by pump 22 to appropriately vary the displacement of the unit 14.

During operation of the hydrostatic drive arrangement shown in FIGURE 1 at relatively low engine speeds, the unit 14 initially assumes a maximum displacement. The engine is therefore effective to power the rotor for unit 14 and to simultaneously deliver driving torque directly to unit 16. The displaced fluid from unit 14 is transferred through passage 18 to unit 16, thereby supplementing the torque transferred directly to unit 16 by the engine through the mechanical flow path above described. The fluid displaced by unit 16 is then returned to unit 14 through return passage 20. It is apparent that whenever the ratio of the displacement of unit 14 to the fixed displacement of unit 16 is greater than the ratio of the differential speed of unit 16 to the speed of unit 14, the unit 16 will be driven with an overdriving speed ratio so that the driven speed of the accessories will be greater than the engine speed. Stated in another way, the ratio of $N_c$ to $N_e$ will then be greater than unity.

When the displacement of hydraulic unit 14 is maintained at its maximum value, the accessory speed will continue to increase as the engine speed increases in direct relationship.

Figure 2:
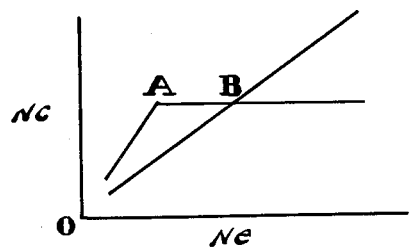
FIGURE 2 is a graphic representation of the relationship between the accessory speed and engine speed for an accessory drive of the type illustrated in FIGURE 1.

Referring next to FIGURE 2, we have shown the speed relationship between the accessory drive shaft and the engine driven power input shaft. The aforementioned direct driving relationship between the accessories and the engine is represented in FIGURE 2 by the line O—A. In one embodiment of our invention the point A corresponds to an engine speed of approximately 1000 r.p.m., and the accessory speed corresponding to the engine speed will be approximately 2000 r.p.m. by reason of the overdriving speed ratio previously described.

The accessory speed of 2000 r.p.m. that is obtained in the preferred embodiment above described corresponds to the optimum design speed for the accessories, and once this speed has been obtained it becomes desirable to maintain the same at a constant value during further engine speed changes. This is done by decreasing the displacement of the hydraulic unit 14. This results in a decrease in the relative speed ratio of hydraulic units 16 and 14. When the product of the displacement and the speed of the unit 14 becomes equal to the product of the displacement and the differential speed of unit 16, the speed ratio between units 14 and 16 will be equal to unity. This point is represented on the chart of FIGURE 2 by the letter B. If the speed of the engine increases still further, it becomes necessary to further decrease the displacement of hydraulic unit 14 in order to maintain the accessory speed at the constant speed setting. This results in a reversal of the fluid flow between hydraulic units 14 and 16. This flow is represented in FIGURE 1 by a vector identified by Symbol $Q_v$, and since this flow can be reversed, as above described, the flow vector which is used to represent the same is bidirectional.

When the hydrostatic drive is operating in the range designated by letters O—A or in the range between points A and B, the hydraulic unit 14 functions as a fluid pump and the hydraulic unit 16 functions as a fluid motor. However, when the speed of the accessories becomes equal to the speed of the engine and when a reversal in the direction of the flow begins to take place, the unit 16 begins to function as a pump and the unit 14 begins to function as a fluid motor. At engine speeds greater than the speed corresponding to the letter B in FIGURE 2, the unit 16 will return power to the power input shaft for unit 14 and there is no undesirable dissipation of the excess power which is made available by the engine. The over-all operating efficiency is thereby maintained at a high value.

It is because of this functional relationship between the hydraulic units that our improved system may be described as a regenerative system with a pair of power delivery paths, one of the paths being a hydraulic path and the other being a mechanical path. The portion of the power being delivered through one path will complement the portion of the power being delivered through the other path so that the total amount of power being delivered from the engine to the accessories will be equal to only that which is required by the accessories. All of the power made available by the engine which is not required to drive the accessories is returned to the engine.

In certain automotive applications to which our hydrostatic drive can be adapted, the accessories may include an engine driven generator, a cooling fan, a water pump for circulating coolant through the engine block and radiator, a power steering pump and an air conditioning compressor and motor. In addition to the foregoing, the automotive accessories may include a high pressure booster brake and a hydro-pneumatic vehicle suspension system with a hydraulic accumulator.

Due to space limitations it becomes very difficult to locate these numerous accesories within the engine compartment. We have overcome this space problem by providing an arrangement in which certain of the accessories, such as the air conditioning compressor, can be powered by means of a hydraulic motor. This will permit the location of the air conditioning compressor at a remote location and it is then only necessary to provide a hydraulic connection between the hydraulic motor and the portion of the system in which the compressor and accumulator are located.

Figure 3:
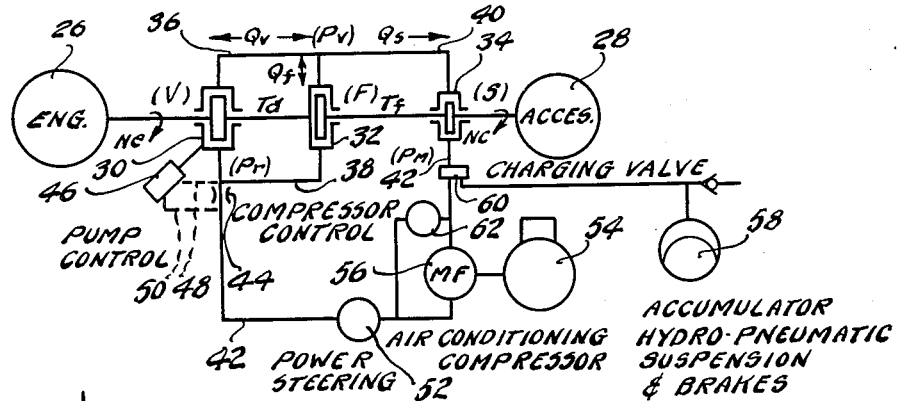
FIGURE 3 shows in schematic form the improved circuit of our instant invention. This circuit embodies a third hydraulic unit which functions as a source for an accessory speed signal and as a fluid pump for driving certain vehicle accessories.

Referring next to FIGURE 3, we have illustrated in schematic form the improved circuit of our instant invention. This circuit utilizes a third hydraulic unit as a speed sensor and as a source of pressure for a fluid motor used for driving certain of the vehicle accessories. This is in contrast to the arrangement shown in FIGURE 1, wherein the third hydraulic unit is used merely as a speed sensor and wherein the accessories are mechanically coupled to the second hydraulic unit 16.

In the circuit of FIGURE 3, the engine is represented by numeral 26 and certain of the accessories, such as the coolant pump and the fan, are represented by numeral 28. A first hydraulic unit is shown at 30 and this may be of the variable displacement type as previously indicated. A differentially driven second hydraulic unit, which may be of fixed displacement, is shown at 32. A third fixed displacement hydraulic unit, which may be of the vane type, is shown at 34. The rotor for unit 30 is positively coupled to the engine and is driven at engine speed $N_e$. The rotor for unit 30 is also mechanically coupled to the rotary housing for unit 32 as suggested by the circuit of FIGURE 1. The rotor for unit 32 is connected to the rotor for unit 34 which in turn is positively coupled to the accessories 28. The unit 30 and the unit 32 are coupled together hydraulically by a passage structure that includes passages 36 and 38. Similarly, the hydraulic unit 32 is hydraulically connected to unit 34 through passage structure shown in part at 40 and 42. The hydraulic units 30, 32 and 34 are therefore situated within a closed hydraulic circuit, and they are coupled together both hydraulically and mechanically.

The hydraulic units 30 and 32 function in a manner that is similar to the mode of operation of units 14 and 16 referred to in the description of the circuit of FIGURE 1. During the initial operation of the hydraulic drive at low engine speeds, the displacement of hydraulic unit 30 is at a maximum value and the rotor of hydraulic unit 32 is therefore overdriven with a speed ratio greater than unity. The chart of FIGURE 2 can also be used to represent the performance characteristics of the circuit of FIGURE 3, and when the speed of the accessories 28 reaches a value corresponding to the point A, the displacement of hydraulic unit 30 is progressively reduced so that the accessory speed will be maintained at a relatively constant value as the engine speed increases still further. The speed relationship of the engine and the accessories will then be represented by the horizontal line A—B in FIGURE 2, and when point B is reached the speed ratio between the engine and the accessories 28 becomes unity. If the engine speed increases still further beyond point B, a reversal in the flow takes place and unit 30 thereafter functions as a motor while unit 32 functions as a pump. The fluid discharged from the unit 34 is distributed through passage 42 to the return side of hydraulic unit 30, and the magnitude of the flow through this passage 42 can be sensed by means of a precalibrated orifice 44. The pressure drop across the orifice is transmitted to a controlling mechanism 46 through passages 48 and 50 situated on opposite sides of the orifice 44.

A power steering unit is designated in FIGURE 3 by numeral 52 and an air conditioning compressor is shown at 54. The compressor 54 is driven by a fluid motor 56.

The accumulator for a hydro-pneumatic suspension and brake system is shown at 58, and the pressure distributed to the accumulator 58 is controlled by a charging valve 60, which will be subsequently explained.

A compressor control is shown at 62 and it functions to regulate the distribution of fluid pressure to motor 56 in a manner which will become apparent from a description of the circuit of FIGURE 5. The hydraulic unit 34 functions as a power steering pump for pressurizing the power steering unit 52.

It will be shown in the subsequent description that the hydraulic unit 34 will be capable of supplementing the pumping action of hydraulic units 30 and 32, and it may therefore be considered to be a supplementary source of pressure or a circuit pressure intensifier. The hydraulic unit 34 also functions as a signal unit for the variable displacement unit 30, as previously explained. Thirdly, the hydraulic unit 34 functions as a power steering pump.

It will also become apparent from the subsequent description that the unit 34 is capable of functioning either as a pump or as a motor depending upon the pressure requirements of the various accessories.

The functional relationship between the hydraulic units 30, 32 and 34 in the circuit of FIGURE 3 can best be explained analytically, and for this purpose the variable displacement unit 30 will hereinafter be represented by the symbol V. Further, the fixed displacement, differentially driven unit 32 will hereinafter be referred to by the symbol F and the hydraulic unit 34 will hereinafter be designated by the letter S. The flow of fluid in passage 36 will be represented by the symbol $Q_v$ and the flow of fluid into hydraulic unit F will be referred to by the symbol $Q_f$. Similarly, symbol $Q_s$ is used to designate the flow of fluid through passage 40 leading to the hydraulic unit S. It will be apparent that the quantity $Q_s$ will be equal to the algebraic sum of the quantities $Q_v$ and $Q_f$. The pressure in passages 36 and 40 will be represented by the symbol $P_v$ and the pressure on the outlet side of the hydraulic unit S will be represented by the symbol $P_m$. The pressure on the downstream side of the fluid motor for the air conditioning compressor and accumulator circuit is represented by symbol $P_r$ which is the supercharge pressure. The torque delivered directly from the engine to the rotary housing for hydraulic unit F is represented by the symbol $T_d$ and the torque delivered through the mechanical portion of the power flow path between hydraulic units F and S is represented by the symbol $T_f$.

Having thus established an appropriate nomenclature, the power relationships for each of the three hydraulic units, V, F and S, can be represented as follows:

For hydraulic unit V, the power input equals $2\pi K T_e N_e$, where $T_e$ is the engine torque, and the power output can be represented by the quantity $2\pi K T_d N_e + K Q_v \Delta P_f$.

In a similar fashion, the power delivered to hydraulic unit F can be represented by the quantity $$2\pi K T_d N_e + K Q_f \Delta P_f$$

and the power delivered from hydraulic unit F can be represented by the quantity $2\pi K T_f N_e$ when $N_e$ is the accessory speed.

For unit S, the power input is equal to the quantity $2\pi T K_f N_e + K Q_s \Delta P_s$ and the power output equals $2\pi K T_c N_c$.

In the above relationships, $\Delta P_f$ equals $P_v - P_r$; $\Delta P_s$ equals $P_v - P_m$ and $\Delta P_m$ equals $P_m - P_r$. Also, the quantity K is a known circuit constant.

Figure 4:
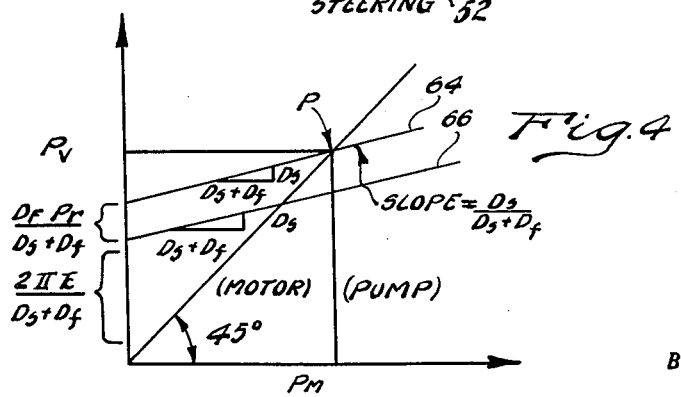
FIGURE 4 is a graphic representation of the performance characteristics of the hydraulic circuit of FIGURE 3; and, FIGURE 5 shows a longitudinal cross sectional view of a preferred embodiment of the hydrostatic mechanism of our instant invention together with a schematic illustration of other portions of the fluid circuit.

Since the power delivered to hydraulic unit S equals the power delivered from hydraulic unit S, the following power relationship can be established:

(1) Power input = Power output (2) $2\pi K T_f N_c + K Q_s \Delta P_s = 2\pi K T_c N_c$ (3) $\Delta P_s = \dfrac{2\pi N_c (T_c - T_f)}{Q_s} = \dfrac{2\pi N_c}{D_s N_c}\left(T_c - \dfrac{D_f P_f}{2\pi}\right)$ (4) $\Delta P_s = P_v - P_m = \dfrac{2\pi}{D_s}\left(T_c - \dfrac{D_f(P_v - P_r)}{2\pi}\right)$ (5) $P_v = \dfrac{2\pi T_c}{D_s} - \dfrac{D_f P_v}{D_s} + \dfrac{D_f P_r}{D_s} + P_m$ (6) $P_v = \dfrac{2\pi T_c - D_f + P_r}{D_s} + P_m$ (7) $P_v\left(1 + \dfrac{D_f}{D_s}\right) = \dfrac{2\pi T_c + D_f P_r}{D_s} + P_m$ (8) $P_v\left(\dfrac{D_s + D_f}{D_s}\right) = \dfrac{2\pi T_c + D_f P_r + D_s P_m}{D_s}$ (9) $P_v = \dfrac{2\pi T_c + D_f P_r + D_s P_m}{D_s + D_f}$ Referring next to FIGURE 4, we have illustrated in graphic form the performance characteristic of the hydraulic circuit of FIGURE 3. More specifically, FIGURE 4 shows the relationship between $P_m$ and $P_v$ with reference to the above expression for $P_v$. If $P_m$ is equal to zero, the value for $P_v$ can be represented as the sum of the quantity $$\dfrac{D_f \times P_r}{D_s + D_f} + \dfrac{2T_c}{D_s + D_f}$$

In the above analysis the quantity $P_r$ is a supercharge pressure which may be made available by a separate supercharge pump. If a supercharge pressure is available, the functional relationship between the quantities $P_m$ and $P_v$ is represented by the line 64. On the other hand, if a supercharge pressure is not available, the relationship between $P_m$ and $P_v$ is represented by the line 66. In most instances, however, it is desirable to have a supercharge pressure so that compensation can be made for the leakage of the various hydraulic units. The hydraulic units are thereby maintained full of oil at all times. For purposes of further discussion, reference will be made only to the line 64.

Since the displacements of hydraulic unit S and hydraulic unit F are constant, the slope of line 64 is constant as indicated in FIGURE 4. If it is now assumed that the load of the accessories is such that the value of $P_m$ is less than that value corresponding to point P on the line 64, the value for $P_v$ which will be obtained will be greater than $P_m$. The unit S will therefore function as a motor. If, however, the value of $P_m$ is greater than the value corresponding to point P, the value of $P_v$ which accompanies that value of $P_m$ will be greater than $P_m$, and the hydraulic unit S will function as a pump. In this capacity, unit S serves to intensify the circuit pressure which is made available by the other hydraulic units. The actual pressure differential which then exists across unit S is not of a high order of magnitude, even though the total load requirements of the accessories is relatively high.

If the supercharge pressure is varied, the location of point P in FIGURE 4 will be varied accordingly. The locus of point P will correspond to a 45 degree line originating at the origin of the chart of FIGURE 4.

It is apparent from the foregoing that the unit S functions automatically to either increase or decrease the circuit pressure in order to accommodate changing hydraulic load demands. This automatic regulation takes place without an undesirable dissipation of power.

Referring next to FIGURE 5, we have shown in cross section a complete working assembly that includes pump or motor units V, F and S. The assembly of these units V, F and S is housed within a common housing 68 in axial alignment as indicated.

Housing 68 is formed with two end openings, one of which has secured therein a bearing retainer 70. A driving shaft 72 is rotatably journaled within housing 68 by means of bearings 74 retained by bearing retainer 70. Shaft 72 extends outwardly and a sheave 76 is secured thereto, as indicated. A suitable seal 77 may be disposed between bearing retainer 70 and shaft 72. The sheave 76 accommodates engine driven belts 78 which form a driving connection between the engine crankshaft and the sheave 76.

The shaft 72 is keyed or splined at 80 to a pump rotor 82 for the variable displacement pump V. The rotor 82 is formed with a plurality of axially disposed pumping chambers 84, and a movable piston 86 is situated within each pumping chamber 84. The pistons 86 are biased in a right-hand direction as viewed in FIGURE 5 by springs 88.

The rotor 82 is situated in sliding engagement with adaptor plate 90 which is apertured as shown at 92 to provide communication between the pumping chambers 84 and a port 94. The port 94 communicates with a threaded port 96, the latter accommodating a fluid fitting.

The apertures 92 also communicate with a port 98 formed in the adaptor plate 90, and the port 98 is in turn in communication with a port 100 formed in housing 68. The ports 94 and 98 are separated from each other by means of fluid seals 102 and 104. The adaptor plate 90 is spring urged into sliding engagement with the pump rotor 82 by means of a spring 106.

The pumping elements 86 carry shoes or slippers 108 on the extended ends thereof, and these shoes are adapted to tilt with respect to the pumping elements 86, a ball-and-socket type connection therebetween being provided for this purpose. The shoes 108 slidably engage a swash plate 110, and they are internally ported to provide fluid communication between the chambers 84 and the contact region between the shoes 108 and the surface of the swash plate 110.

The swash plate 110 is pivoted for oscillation about a transverse axis and it is provided with pivot shafts 112 for this purpose. Shafts 112 may be journaled within cooperating bearing apertures formed in the stationary housing 68.

The swash plate 110 is formed with a central opening 114 through which a shaft 72 extends. The diameter of shaft 72 is substantially smaller than the minimum diameter of opening 114 so that a limited degree of oscillation of swash plate 110 about the axis of pivot shafts 112 may take place without interference between swash plate 110 and the shaft 72.

It will be apparent from the foregoing that when the swash plate 110 is positioned on an angle, as illustrated in FIGURE 5, the pumping elements 86 will reciprocate within chambers 84 when the rotor 82 is driven about the axis of shaft 72. In FIGURE 5, one of the pumping elements 86 is shown in the fully retracted position and another pumping element 86 is shown in the fully stroked position. The port 94 is situated so that the chambers 84 will communicate therewith when the cooperating pumping elements are in a retracted position, and the port 98 communicates with the chambers 84 when the pumping elements 86 assume a stroked position. The port 98 and the port 94 can therefore be referred to as an intake port and an outlet port respectively.

The shaft 72 is journaled within housing 86 by a needle bearing assembly 116. The shaft 72 is formed integrally with a rotary housing 118 for the hydraulic unit F. The housing 118 is properly of cylindrical form as shown in FIGURE 5. A fluid rotor 120 is situated within housing 118 and it is formed with pumping chambers 122. Each of the chambers 122 has reciprocally mounted therein pumping elements 124 that extend outwardly in an axial direction so that they contact a bearing race 126. This bearing race 126 forms a part of a thrust bearing assembly that also includes a race 128 and thrust balls 130 situated between races 128 and 126. The race 128 is seated on a bearing adaptor 132 secured in the open end of housing 118. Adaptor 132 includes an extension which is piloted within a cooperating opening formed in a closure plate 134 situated adjacent the left end of the housing 68.

The rotor 120 is positively splined or otherwise coupled to a centrally disposed shaft 136 so that when the rotor 120 is driven, power is delivered to the shaft 136. A bearing 138 is disposed between adaptor 132 and shaft 136 for journaling the latter.

The thrust bearing assembly designated by reference characters 126, 128 and 130 is situated on a bias so that when relative motion takes place between the rotor 120 and the rotary pump housing 118, the pumping elements 124 will reciprocate within the pumping chambers 122. The rotor 120 is normally urged in a right-hand direction, as viewed in FIGURE 5, into sliding engagement with the right-hand end of the cavity defined by housing 118, a suitable spring 140 being provided for this purpose.

The rotor 120 is formed with a plurality of passages 142 which are adapted to communicate with an annular groove 144. The groove 144 in turn communicates with a port 146 formed in a pump adaptor 148. The port 146 in turn communicates with passage 40, previously discussed with reference to FIGURE 3. Ports 142 also communicate with an annular groove 150 formed in adaptor 148, and this groove 150 in turn communicates with the aforementioned port 100 through an internal passage designated by reference character 152. The adaptor 148 is normally urged into sliding engagement with the pump housing 118 by a spring 154.

When the individual pumping chambers 122 assume a position which corresponds to a retracted position of the cooperating pumping elements 124, they communicate with port 146. On the other hand, when the chambers 122 are rotated so that the pumping elements 124 assume a stroked position, they communicate with annular groove 150 and the communicating port 100. If desired, a pressure relief valve 156 can be provided at this point, although during normal operation the valve 156 will be closed.

The shaft 136 extends through shaft 30 in concentric relationship, and spaced bearings may be provided between these shafts as indicated at 158 and 160. Shaft 136 extends outwardly and is adapted to carry a sheave 162. A driving belt 164 for accessories 28 is trained over sheave 162.

The other end of shaft 136 is drivably coupled to a rotor 166 for hydraulic unit S. This rotor 166 may be formed with radial slots 168 for accommodating pumping vanes 170. These vanes 170 in turn engage camming surfaces 172 and 174. The pumping chambers defined by the plurality of vanes 170 cooperate with the surrounding cam surfaces, and as the rotor 166 is rotated with respect to these cam surfaces, the volume of the pumping chambers progressively increase and decrease thereby establishing a pumping action in a known fashion. An inlet port 176 and an outlet port 178 are formed in a closure member 180, and when hydraulic unit S is in operation fluid flow takes place from port 176 to port 178. Port 176 is in fluid communication with the aforementioned passage 40 and port 178 is in fluid communication with the aforementioned passage 42.

In the cross sectional view of FIGURE 5, the passage 150, the port 100 and the port 98 form a counterpart for passage 36 which was referred to with reference to FIGURE 3.

The mechanism for adjustably positioning swash plate 10 may comprise a servo motor as indicated in FIGURE 5. This servo motor comprises a cylinder 182 secured to housing 68. A piston 184 is reciprocally mounted within cylinder 182 and it is formed with a piston rod 186. An adjusting lever 188 may be mechanically connected to a pivot shaft 112 for the swash plate 110 and it may be coupled to piston rod 186 by a suitable link 190. Actuating pressure is supplied to the swash plate adjusting servo through a passage 192 that communicates with the aforementioned controlling mechanism 46.

The mechanism 46 will respond to pressure the differential across precalibrated orifice 44 to appropriately control the degree of communication between the passage 194 and passage 192, the former communicating with the high pressure region of the circuit. Note that passage 194 communicates with the accumulator 58 which is normally maintained at a relatively high pressure during operation. As previously indicated, the rate of flow through passage 42 and orifice 44 is an indication of the speed of the accessories 28 so that changes in the speed of accessories 28 will be sensed by the controller 46 to appropriately distribute servo actuating pressure to the swash plate actuating servo. In this way the displacement of the pumping unit V can be appropriately controlled to maintain a constant accessory speed as previously explained.

It is apparent from the foregoing that the three hydraulic units, V, F and S, are interconnected both hydraulically and mechanically and they function together in a closed circuit to provide a compact, hydrostatic accessory drive mechanism of maximum efficiency. The drive mechanism is also characterized by low circuit pressures.

Although we have not illustrated a supercharge pump in FIGURE 5, we contemplate that such a pump may be incorporated in the circuit with a minimum of difficulty. According to one operating embodiment of our invention, a supercharge pressure of about 50 p.s.i. is maintained and the supercharge pump is drivably geared to the shaft 72. This pump may be housed within a portion of the housing 68. The intake side of the supercharge pump may communicate with a sump 196 and the discharge side of the supercharge pump may be connected to passage 42.

The sump 196 is also adapted to accommodate leakage from the interior of the hydraulic unit, a suitable drain port 198 being provided for this purpose.

As indicated in FIGURE 5, the passage 42 communicating with the discharge side of hydraulic unit S has situated therein a flow divider valve 200. This valve comprises two branch passages 202 and 204 which communicate with opposite sides of a valve chamber within which is situated a flow divider valve element 206. Valve element 206 controls the distribution of fluid pressure to an accumulator passage 208 and to the portion of passage 42 on the downstream side of the flow divider valve.

Valve 200 diverts a certain degree of the flow in passage 42 to passage 208. Charging valve 60 is situated within passage 208 and it is spring biased in a downward direction as viewed in FIGURE 5. When the valve 60 assumes the position shown, free communication is established between accumulator 58 and the flow divider valve. When the accumulator pressure builds up to the desired operating pressure level, a hydraulic servo valve actuator 210 moves valve 60 against the opposing force of the valve spring to block communication between passage 208 and flow divider valve 200 and to simultaneously establish communication between the flow divider valve branch passage 204 and the downstream portion of passage 42.

Valve 200 includes a flow restricting orifice in each of the branch passages 202 and 204. These orifices are calibrated so that the flow through passage 202 will be substantially greater than the flow through passage 204 when the accumulator is charging. In one preferred embodiment of our invention the total flow through passage 42 is about 6 gallons per minute at 3000 engine r.p.m. The branch passage 202 is adapted to accommodate about 5 gallons per minute of this total flow and the branch passage 204 will accommodate approximately 1 gallon per minute while the accumulator is charging.

During those instances in which the accumulator portion of the circuit is charging, the pressure in that portion of the circuit progressively increases. This tends to change the pressure drop across the orifice for branch passage 204, and unless an appropriate compensation is made, this change in pressure drop will upset the ratio of the rates of flow of fluid through passages 202 and 204.

The valve 200 provides such a compensation since an increase in the pressure in the accumulator portion of the circuit will cause the valve 200 to move upwardly as viewed in FIGURE 5. This decreases the degree of communication between passage 202 and the downstream side of passage 42, and the pressure drop across the orifice in branch passage 202 thereby tends to change to the same extent that the pressure drop across the orifice in branch passage 204 tends to change. Since the pressure drop across each of these two orifices is thereby balanced by the valve 200, the ratio of the rates of flow of fluid through these branch passages is maintained at a constant value.

Passage 42 communicates directly with the intake side of a hydraulic motor for the compressor 54. However, the compressor may be bypassed through a bypass passage 212 during those instances in which the compressor is not operating. A solenoid operated valve 214 is situated in bypass passage 212 and it is spring biased in an upward direction, as indicated. When the valve 214 assumes the position shown, the bypass passage 212 establishes free communication around the compressor motor. To operate the compressor, a manual switch 216 is operated and this closes an electrical circuit that includes battery 218 and valve operating solenoid 220, the latter thereby being energized. This causes valve 214 to move in a downward direction, as viewed in FIGURE 5, thereby blocking bypass passage 212. The entire flow will therefore pass directly through the compressor motor thereby driving the compressor for the air conditioning system.

A second switch is shown at 222. This switch is thermostatically operated so that when the ambient temperature within the passenger compartment of the vehicle reaches a desired value, the switch will open to deactivate the solenoid and causes the valve 214 to move to a bypass position.

The power steering gear is situated in series relationship with respect to the compressor, and the pressure requirements of the power steering gear and of the compressor motor are accordingly additive. If the system pressure requirements which are dictated by the power steering gear and the compressor motor exceed a predetermined operating level, a pressure switch 224 will be actuated thereby interrupting the solenoid 220 to again cause the valve 214 to assume a bypass position. The bypass flow through passage 42 will therefore be directed into the power steering gear. In this way priority is given to the power steering gear for safety purposes in the event that the capacity of the circuit is not capable of accommodating the requirements of both the power steering gear and the compressor. An overpressure relief valve is shown at 213.

During normal operation the flow requirements of the compressor motor are greater than the flow requirements of the power steering gear. For this reason a flow control valve 226 is situated in the circuit between the power steering gear and the compressor motor in order to effect a desired distribution of flow to the steering gear. Any flow in passage 42 which is in excess of the designed value for the power steering gear will be bypassed around the power steering gear by the flow control valve 246.

Having thus described a preferred embodiment of our invention, what we claim and desire to secure by United States Letters Patent is:

1. A hydrostatic system comprising a hydrostatic transmission mechanism, said mechanism including pump and motor units disposed in a closed hydraulic circuit, a pressure accumulator, conduit structure interconnecting a high pressure region of said circuit and said accumulator, said conduit structure comprising a fluid flow divider valve having two branch portions, one branch portion being common to said circuit and the other defining in part said conduit structure, a fluid pressure operated mechanism having a pressure supply conduit communicating with said one branch portion and a return passage communicating with a low pressure region of said circuit, a flow restricting orifice situated in each branch portion, a flow divider valve chamber having separate portions that respectively define part of separate ones of said branch portions, a valve spool disposed in said valve chamber, said valve spool being movable to decrease the rate of flow of fluid through one branch portion and to increase simultaneously the rate of flow through the other branch portion, the fluid pressure on the downstream side of one orifice acting on one side of said valve spool to urge the same in one direction, the fluid pressure on the downstream side of the other orifice acting on another side of said valve spool to urge the same in the opposite direction, and valve means responsive to the pressure in said accumulator for interrupting communication between said accumulator and said other branch portion and establishing communication between said other branch portion and said pressure supply conduit upon an increase in accumulator pressure beyond a predetermined degree.

2. A hydrostatic system comprising a hydrostatic transmission mechanism, said mechanism including pump and motor units disposed in a closed hydraulic circuit, a pressure accumulator, conduit structure interconnecting a high pressure region of said circuit and said accumulator, said conduit structure comprising a fluid flow divider valve having two branch portions, one branch portion being common to said circuit and the other defining in part said conduit structure, a flow restricting orifice situated in each branch portion, a flow divider valve chamber having separate portions that respectively define part of separate ones of said branch portions, a valve spool disposed in said valve chamber, said valve spool being movable in either direction to decrease the rate of flow of fluid through one branch portion and to simultaneously increase the rate of flow through the other branch portion, the fluid pressure on the downstream side of each orifice acting on a separate side of said valve spool to actuate the same, and valve means situated in and partly defining said other branch passage portion for alternately connecting said other branch portion with said one branch portion and interrupting the same in response to increases and decreases respectively in the accumulator charging pressure.

3. In a fluid pressure system, a source of fluid pressure, fluid pressure operated mechanism, conduit structure interconnecting said pressure source and said mechanism, said conduit structure including a pair of branch passage portions, a fluid pressure accumulator situated in one of said branch passage portions, a flow divider valve means in said conduit structure partly defining said branch passage portions for controlling the relative rates of fluid flow through said branch passage portions, and fluid pressure operated valve means for bypassing said accumulator when the pressure of the later reaches a predetermined value, said last named valve means being subjected to and actuated by accumulator pressure and including a movable valve element, a valve chamber partly defining said one branch passage portion, said valve element blocking communication between said one branch passage portion and said accumulator and establishing communication between said one branch passage portion and said mechanism upon an increase in the pressure in said accumulator.

4. In a fluid pressure system, a source of fluid pressure, at least two fluid pressure operated mechanisms, conduit structure interconnecting said pressure source and said mechanisms, said conduit including a pair of branch passage portions, a fluid pressure accumulator situated in one of said branch passage portions, a flow divider valve means in said conduit structure partly defining said branch passage portions for controlling the relative rates of fluid flow through said branch passage portions, and fluid pressure operated valve means for bypassing said accumulator when the pressure of the latter reaches a predetermined value, said last named valve means being subjected to and actuated by accumulator pressure, said mechanisms being situated in series relationship in said conduit structure, and second fluid pressure operated valve means for bypassing one of said mechanisms in response to the back pressure produced on the upstream side thereof whereby priority in the pressure distribution is given to the other mechanism.

5. In a hydrostatic system including a hydrostatic unit, conduit structure interconnecting the discharge and supply sides of said unit, a fluid pressure operated accessory in said conduit structure, branch passages situated in said conduit structure and partly defining the same, a flow divider valve means in said conduit structure on the upstream side of said branch passage portions, said flow divider valve means including a movable valve spool having a pair of valve lands defining in part each of said branch passage portions, said flow divider valve means being adapted to regulate the relative rates of fluid flow through each of said branch passage portions, a fluid pressure accumulator connected to one of said branch passage portions, and a bypass valve means for alternately connecting said one branch passage portion to said accumulator and to said conduit structure on the downstream side of said flow divider valve means, said bypass valve means being subjected to and responsive to fluid pressure in said accumulator.

6. In a fluid pressure system, a source of fluid pressure, at least two fluid pressure operated mechanisms, conduit structure interconnecting said pressure source and said mechanisms, said mechanisms being situated in series relationship in said conduit structure, bypass passage means situated in parallel relationship with a portion of said conduit structure for distributing fluid directly to one of said mechanisms while bypassing the other, and pressure operated valve means situated in and forming a part of said conduit structure portion and said bypass passage means for distributing fluid directly to said bypass passage means and interrupting distribution of fluid pressure to said other mechanism in response to an increase in the back pressure produced on the upstream side of said mechanisms whereby priority in the distribution is given to said one mechanism.

7. In a fluid pressure system, a source of fluid pressure, at least two fluid pressure operated mechanisms, conduit structure interconnecting said pressure source and said mechanisms, said mechanisms being situated in series relationship in said conduit structure, bypass passage means situated in parallel relationship with a portion of said conduit structure for distributing fluid directly to one of said mechanisms while bypassing the other, and pressure operated valve means situated in and forming a part of said conduit structure and said bypass passage means for distributing fluid directly to said bypass passage means and interrupting distribution of fluid pressure to said other mechanism in response to an increase in the back pressure produced on the upstream side of said mechanisms whereby priority in the distribution of fluid pressure is given to said one mechanism, said pressure operated valve means including an electrical solenoid valve actuator, said actuator including an electrical solenoid circuit defined in part by two series related switches, one switch being subjected to said back pressure and actuated thereby and the other switch being adapted to be controlled independently of pressure.

8. In a fluid pressure system, a source of fluid pressure, at least two fluid pressure operated mechanisms, conduit structure interconnecting said pressure source and said mechanisms, said conduit structure including a pair of branch passage portions, a fluid pressure accumulator situated in one of said branch passage portions, a flow divider valve means in said conduit structure partly defining said branch passage portions for controlling the relative rates of fluid flow through said branch passage portions, fluid pressure operated valve means for bypassing said accumulator when the pressure of the latter reaches a predetermined value, said last named valve means being subjected to and actuated by accumulator pressure, said mechanisms being situated in series relationship with said conduit structure, a bypass passage disposed in parallel relationship with respect to a portion of said conduit structure for distributing fluid directly to one of said mechanisms while bypassing the other, priority valve means disposed in and partly defining said bypass passage means and said conduit structure, and means responsive to the back pressure produced on the upstream side of said mechanisms for actuating said priority valve means.

9. The combination as set forth in claim 8 wherein said priority valve includes a solenoid valve actuator having a circuit defined in part by a pair of series related switches, one of said switches being responsive to said back pressure and another of said switches being adapted to be actuated independently of said one switch.

References Cited in the file of this patent

UNITED STATES PATENTS

| | | |
|---|---|---|
| 2,708,344 | Greer | May 17, 1955 |
| 2,799,996 | Van Meter | July 23, 1957 |
| 2,846,850 | Hall | Aug. 12, 1958 |